United States Patent
Dorenbosch et al.

(10) Patent No.: US 7,343,313 B2
(45) Date of Patent: Mar. 11, 2008

(54) METHOD AND APPARATUS FOR SCHEDULING A MEETING

(75) Inventors: Jheroen Pieter Dorenbosch, Paradise, TX (US); Richard Lionel Bennett, Southlake, TX (US); Steven Jeffrey Goldberg, Downingtown, PA (US); W. Garland Phillips, Arlington, TX (US)

(73) Assignee: Motorola, Inc., Schaumburg, IL (US)

( * ) Notice: Subject to any disclaimer, the term of this patent is extended or adjusted under 35 U.S.C. 154(b) by 890 days.

(21) Appl. No.: 10/262,142

(22) Filed: Oct. 1, 2002

(65) Prior Publication Data

US 2004/0064355 A1    Apr. 1, 2004

(51) Int. Cl.
*G06F 9/46* (2006.01)
(52) U.S. Cl. ........................................................ 705/8
(58) Field of Classification Search .................... 705/1, 705/7, 8, 9; 710/8; 345/751; 465/42; 379/202.01; 725/22; 708/112
See application file for complete search history.

(56) References Cited

U.S. PATENT DOCUMENTS

| | | | | |
|---|---|---|---|---|
| 4,885,632 A * | 12/1989 | Mabey et al. | ................... | 725/20 |
| 5,099,510 A * | 3/1992 | Blinken, Jr. et al. | .... | 379/202.01 |
| 5,124,912 A * | 6/1992 | Hotaling et al. | ................ | 705/9 |
| 5,323,314 A * | 6/1994 | Baber et al. | ..................... | 705/8 |
| 5,491,797 A * | 2/1996 | Thompson et al. | ......... | 709/204 |
| 5,664,126 A * | 9/1997 | Hirakawa et al. | ........... | 345/751 |
| 5,830,069 A * | 11/1998 | Soltesz et al. | ................ | 463/42 |
| 6,085,166 A * | 7/2000 | Beckhardt et al. | ............. | 705/9 |
| 6,209,011 B1 * | 3/2001 | Vong et al. | ................... | 708/112 |
| 6,263,209 B1 * | 7/2001 | Reed et al. | .............. | 455/456.3 |
| 6,380,968 B1 * | 4/2002 | Alexander et al. | ........ | 348/14.05 |
| 6,431,772 B1 * | 8/2002 | Melo et al. | .................... | 400/70 |
| 2001/0014866 A1 * | 8/2001 | Conmy et al. | .................. | 705/9 |
| 2002/0042810 A1 * | 4/2002 | Minami et al. | ............. | 709/203 |
| 2003/0110067 A1 * | 6/2003 | Miller et al. | .................... | 705/8 |
| 2003/0233265 A1 * | 12/2003 | Lee et al. | ....................... | 705/8 |
| 2004/0034723 A1 * | 2/2004 | Giroti | ............................ | 710/8 |

FOREIGN PATENT DOCUMENTS

WO    WO 00/08583    *    2/2000

OTHER PUBLICATIONS

Internet: a global network of networks. Hotel & Motel Management, v 212, n 11, p. 46+, Jun. 1997.*
On Technology Enhances Sheduling Software To allow Meeting Notices Through E-Mail, Proxies Across Severs.*
On Technology Enhances Scheduling Software To Allow Meeting Notices Through E-Mail, Proxcies Across Servers. PR Newswire, pN/A, May 25, 1995.*
Cesta, Amedeo & Daniela D'Aloisi. "Building Interfaces as Personal Agents." SIGCHI Bulletin, vol. 28, No. 3, pp. 108-113, Jul. 1996.*

(Continued)

*Primary Examiner*—Susanna M. Diaz

(57) ABSTRACT

A method of and processing function for a resource for facilitating scheduling a meeting the method 200 including specifying 203 individuals to participate in the meeting and desired resources for facilitating the meeting; communicating 207 with scheduling agents for the individuals and with a processor function 300 for a resource 311 corresponding to the desired resources; negotiating with the scheduling agents to determine availability of the individuals and with the processor function to determine availability of the resource; and scheduling 211, 215 the meeting at a time when the resource and a sufficient number of the individuals are available.

27 Claims, 3 Drawing Sheets

OTHER PUBLICATIONS

"Request for Comments on RFC 2739" retrieved from [URL: http://www.faqs.org/frcs/rfc2739.html], submitted by T. Small, D. Hennessy, & F. Dawson, dated Jan. 2000.*

Wong et al. "A Model for Resource Negotiation Using Mobile Agents." Proceedings of Fourth World Multiconference on Systemics, retrieved from Google Scholar, dated 2000.*

Josh McHugh, "There today's campus life is the prototype of tomorrow's network society.", Oct. 2002, Unplugged U magazine, pp. 122-125.

* cited by examiner

METHOD AND APPARATUS FOR SCHEDULING A MEETING

FIELD OF THE INVENTION

This invention relates in general to coordination of people and resources, and more specifically to a method and apparatus for scheduling and facilitating a meeting.

BACKGROUND OF THE INVENTION

Various systems and software packages exist for assisting with setting up meetings. These systems or software applications are focused on assuring availability of individuals and ordinarily include or rely on a calendar for the respective individuals. Normally the systems will provide meeting notices with certain meeting particulars such as topic, time and location to the participants and may quasi automatically update the individuals calendar. These systems may provide reminder messages that are automatically sent to the individuals a fixed amount of time prior to the meeting. Present systems are usually centrally based or rely on a central or even ad-hoc people managed systems (logbooks) for such specifics as meeting room availability. Present systems do not consider resource requirements such as various audio visual resources that may be required for the meeting. These details are left up to the meeting coordinator to deal with. A need exists for more autonomous and comprehensive meeting arrangement methods and apparatus that will consider more of the requisites for a meeting.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

Figure 1:
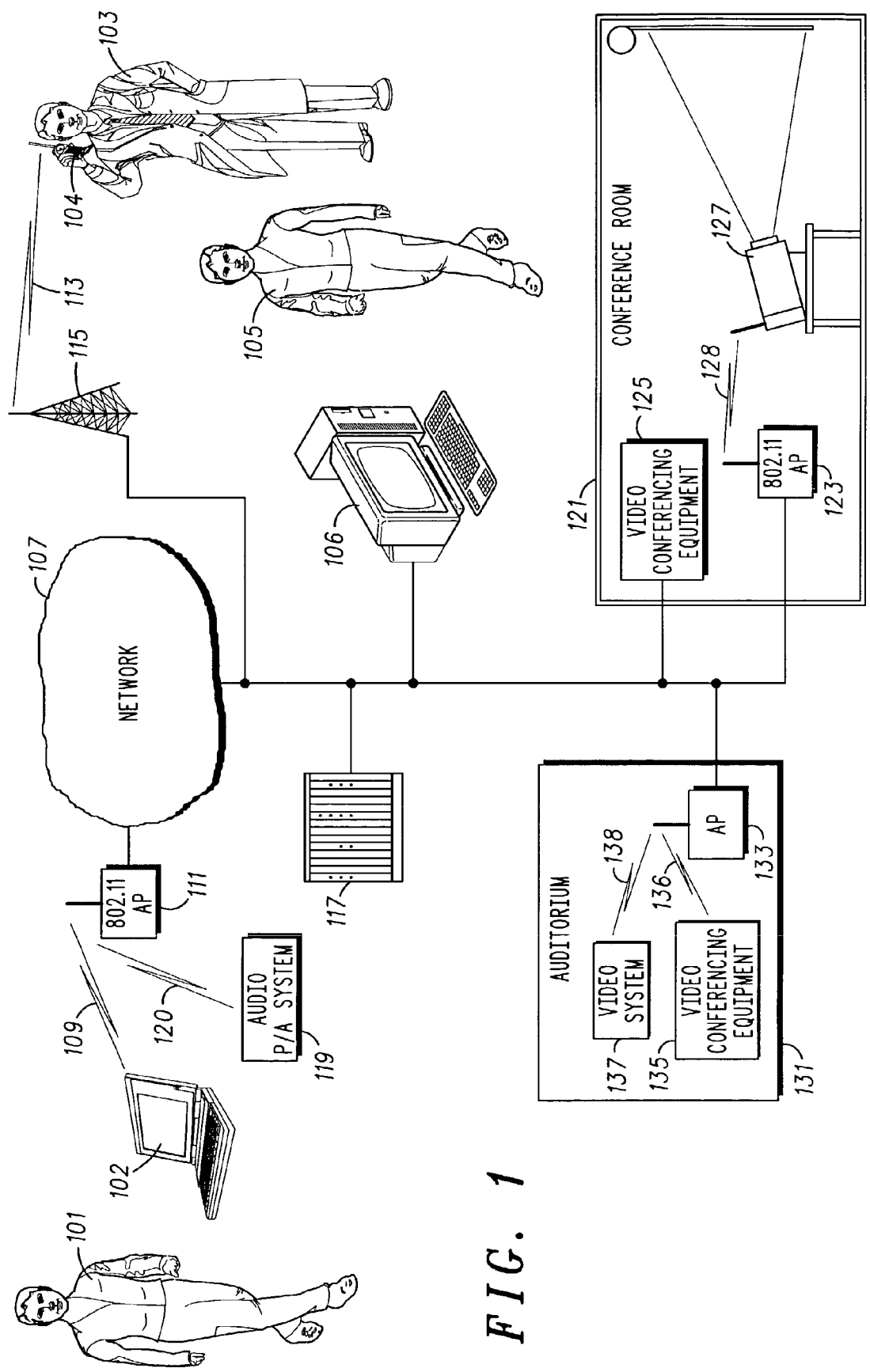
FIG. 1 depicts, in a simplified and representative form, a contextual setting for arranging a meeting.

In overview form the present disclosure concerns systems, methods, and equipment or apparatus that provide coordination services among people and resources and specifically meeting arrangement or scheduling services for coordinators, participants or their devices or units, such as cellular phones or two-way radios and the like, and meeting facilitation resources or equipment. More particularly various inventive concepts and principles embodied in resources or user devices and methods therein for providing coordination services among equipment or resources and individuals or specifically meeting coordination and scheduling services among such entities, many or all with distributed processing abilities, for the convenience and advantage of users or consumers of such services are discussed and described. The systems, resources, and the like and methods of coordination rely on some form of connectivity, thus network, that may be any combination of wired and wireless networks. Networks of particular interest may be organized on a wide area network (WAN) or local area network (LAN) basis in a structured or adhoc manner and should be suitable for modest bandwidth communications. It is expected that a preferred form of access to this network by resources or equipment and individuals or their respective devices may be a low power, thus local, wireless packet data link or connection such as available using IEEE 802.11 based access techniques and equipment.

As further discussed below various inventive principles and combinations thereof are advantageously employed to provide coordination services such as meeting scheduling or arrangement services among equipment and personnel with distributed processing capabilities, thus alleviating various problems associated with known centrally managed systems that ignored or relied on adhoc people driven schemas for managing equipment or resources while advantageously facilitating a full and expanded range of features and applications for users thereof provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1, a simplified and representative system level diagram depicting a contextual setting for arranging a meeting will be discussed and described. The diagram shows a plurality of individuals or participants 101, 103, 105 with a current and respective associated device, specifically portable computer, cellular handset, and desktop computer 102, 104, 106 each including or having access to a respective scheduling agent or application or calendar operating thereon or there through. These individuals via their respective devices are coupled in various manners to a network 107 along with various other entities or resources. For example individual 101 via portable computer 102 is coupled by way of a wireless IEEE 802.11 based link 109 to an 802.11 access point (AP) 111 and from there to the network 107. Individual 103 via a cellular handset 104 or personal digital assistant or messaging device or the like is coupled by way of wireless link 113 and a wireless WAN 115, such as a cellular system or packet data system to the network 107. Individual 105 via a desktop computer 106 is coupled via a wired LAN or WAN connection to the network 107. Preferably the individuals are identified or associated with a uniform resource identifier (URI) and thus as they move about the URI moves with them from one associated device to another. For example any of the individuals may use devices similar to any of the depicted computers, handsets, or other types of equipment for connectivity and the specific device may vary depending on the individuals circumstances, such as location and activities (office, home, in route, traveling, etc.) while the URI will preferably continue to be associated with whatever device the specific user is now relying on with this likely depending on some affirmative action on the part of the user. Alternatively the individuals or respective devices may be identified with traditional IP addresses or phone numbers or the like.

In any event other entities, devices, or resources are also coupled to the network 107 and thus inter coupled to each other and the individuals via their respective devices. These include a server 117 that may be used for executing applications program that may be accessed by any of the individuals, as a meeting coordinator, in order to call, arrange, schedule or setup a meeting if their respective device is not suitable for such an application and may also be used as a depository of last known calendars for individuals or even resources that are out of touch at the moment.

Other exemplary resources, each with an associated and preferably embedded processing function, that may be suitable, desired, or required for facilitating meetings that are coupled to the network include an audio PA system with associated processing function 119 coupled via a wireless IEEE 802.11 based link 120 to AP 111; a conference room 121 with associated processing function 123 that is also advantageously an IEEE 802.11 AP that is coupled to other processing units for resources or equipment within the conference room such as a projector 127 via link 128; video conferencing equipment and associated processing function 125 shown resident in the conference room 121 and wired to the network 107, although this resource or equipment could as well be wirelessly linked to the AP 123; a further conference room or auditorium 131 with associated processing function 133 that is also advantageously a wireless AP, that may or may not be an IEEE 802.11 AP, is coupled to video conference equipment 135 via wireless link 136 and a video system 137 via wireless link 138. Communications with or among the resources may be facilitated with URIs or other traditional means however for resources that move locations routinely a URI is the preferred approach.

Figure 2:
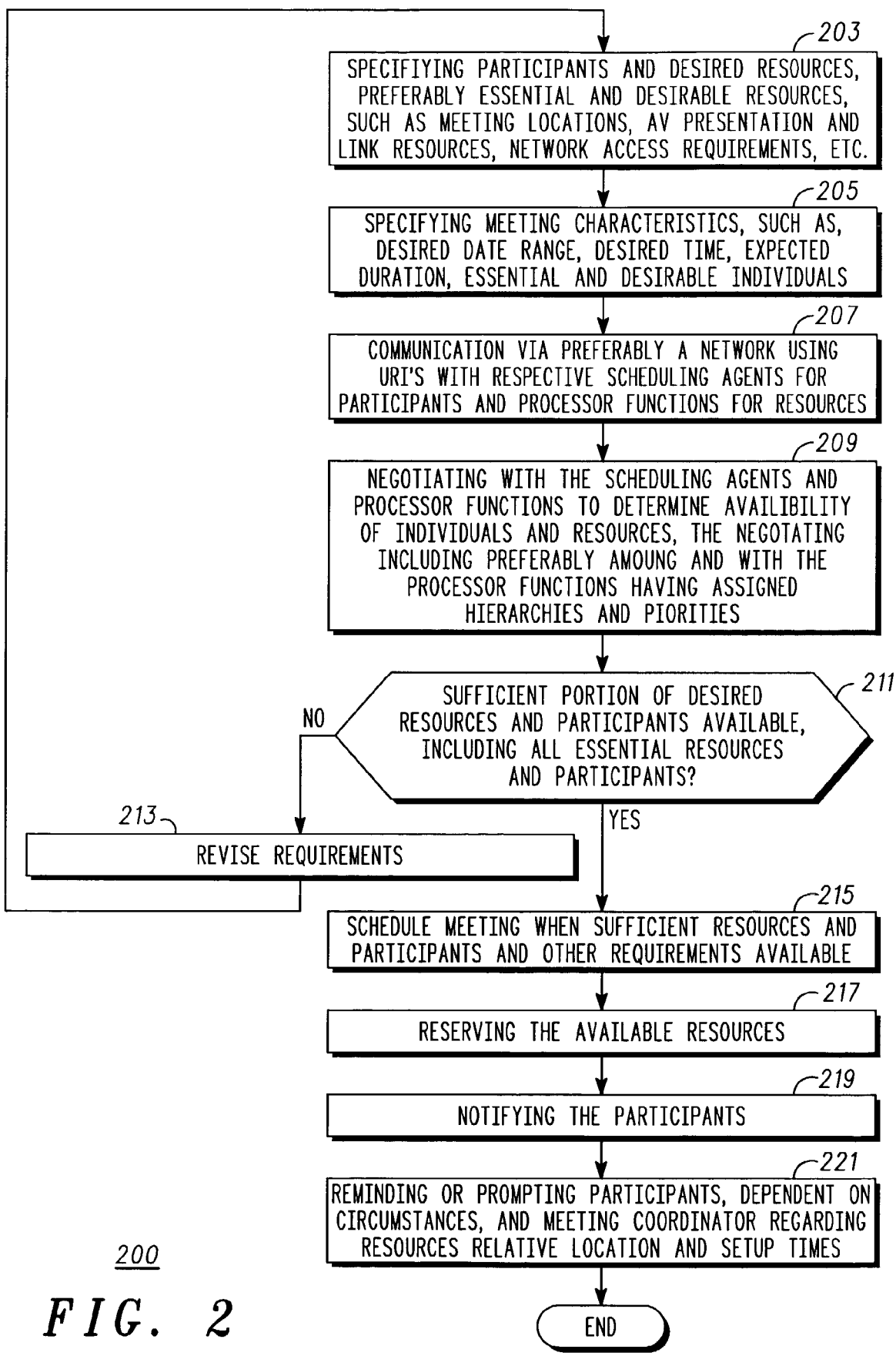
FIG. 2 illustrates a flow chart of a preferred method embodiment of scheduling a meeting.

As will be evident the various resources may be relatively geographically proximate such as the same building or distant such as different buildings, cities, states, or countries. Furthermore in practical systems it is expected that a multiplicity of varying types of resources (overhead projectors, computer driven overhead projectors, podiums, different capability audio PA system, video recorders and players of varying format and feed, copying whiteboards, etc. as well as many more conference rooms of varying capacity and seating arrangements all for facilitating meetings are likely available and inter coupled and include there respective processing functions for effecting the principles and concepts herein discussed and disclosed Referring to FIG. 2, a flow chart of a preferred method embodiment of scheduling a meeting will be discussed and described. The method 200 is for arranging or scheduling and otherwise advantageously facilitating a meeting and begins at 203 with determining or specifying or generating a list of a plurality of individuals or participants or attendees to participate in the meeting and a one or more resources, such as a projector or the like or a list of desired resources, preferably essential and desirable resources for facilitating the meeting. For example an overhead projector may be essential in order to conduct the meeting while a computer driven overhead projector is desirable. These desired resources may include locations including a prioritized list of desired conference rooms or merely building identifiers, audio visual presentation resources, audio visual links to other locations if the locations are more than one, computer or participant network access requirements and so on. Then or additionally at 205 determining or specifying meeting characteristics such as topics or objectives, desired date range (date or range of dates or two different dates, for example), desired time (2:30PM, AM, PM, etc.), expected duration, and essential vs desirable or alternative participants or advisory individuals or groupings thereof (such as two of Bob, Joe, and Ed) is undertaken. The processes reflected at 203 and 205 are expected to be undertaken by the meeting coordinator or an assistant therefore, specifically the one who is scheduling or calling the meeting with the aid of a meeting scheduling application resident and executing on the coordinators associated device or resident on a server and accessed by the coordinators device.

After establishing the basics of the meeting above, 207 shows communicating, preferably via the network, using IP based packet data protocols and respective URIs with a plurality of scheduling agents corresponding, respectively, with the participants or plurality of individuals expected to attend the meeting and with one or more processor functions for the, respective, one or more resources corresponding to the one or more or list of desired resources. For example if a video projector is one of the list of desired resources, multiple processing units associated with such projectors may be communicated with the expectation that one will be available. This may be done sequentially as in contact one and perhaps if the response is not satisfactory ask another and so on. A list of desired resources of a given type (i.e. projectors) may be stored at a central repository such as the server 117 or at one or more of the participant devices 102, 104, 106. For each resource, the list would specify how the resource can be reached (i.e. IP address, URI of associated processing function) and circumstances (i.e. setup time, computer controlled, location).

Then 209 shows negotiating with the scheduling agents to determine availability of the plurality of individuals or participants as well as with the one or more processor functions for the, respective, one or more resources to determine availability of the one or more resources. The negotiating may be conducted with or between the meeting scheduling application and a processing function or may be among or between different processing functions according to hierarchies and priorities among the resources all pursuant to identifying sufficient resources. For example the auditorium 131 may have a higher hierarchical position among resources, such as other conference rooms and thus a request for a particular resource such as the audio PA system 119 for use within the auditorium would take priority over the same request for the same resource for use within the conference room 121, even if later made. This negotiation can be handled between the conference rooms, specifically processing functions thereof without troubling the meeting coordinator. The resource that has been rescheduled would report that event to a third party arbiter or system wide manager as well as the coordinator who originally reserved the resource and can as well initiate a further search on behalf of the coordinator. The third party arbiter or system wide manager, in this instance, may be an application running on the central server 117 or on one of the participant devices 102, 104, 106. For example a similar resource may be available at a different location that would not be as convenient but never the less would resolve this apparent conflict and could thus be reserved. Obviously a designation as an essential resource would win over a designation as a desirable resource. Thus a later request for a computer driven overhead projector as an essential resource may result in a change in a reservations for that projector as a desirable resource for another meeting. Note that priorities among individuals may adjust priorities among resources. For example if the CEO schedules a meeting, even essential equipment and resources may be reassigned or re-reserved from an earlier reservation. Inevitably conflicts will arise as a result of requests for the same resources at the same time and it is expected that the meeting scheduling application will have a third party arbiter that can resolve otherwise irresolvable conflicts. This party may also be in charge of resource acquisition, whether by rental or purchase, and thus able to take actions to eliminate one time or recurring conflicts. It is anticipated that one of ordinary skill will be able to develop many more rules for conflict resolution in view of the principles and concepts herein disclosed.

At any rate next 211 tests to determine or ascertain whether a sufficient portion of the desired resources and participants are available, including any essential resource and participant according to threshold conditions specified by the meeting coordinator (at least 2 of these 4 resources for example) and if not then 213 indicates that requirements need to be modified and the process returns to 203 for such revisions. If the availability thresholds are satisfied 215 indicates scheduling the meeting at a time when the sufficient resources and a sufficient number of the individuals or participants are available. After scheduling or as part of scheduling 217 shows reserving the sufficient portion of the desired resources that are available for the time of the meeting and 219 indicates a process of notifying the sufficient number of the plurality of individuals or available participants.

Then 221 indicates prompting or reminding the participants, dependent on the particular participant's circumstances as well as prompting or reminding the meeting coordinator or other resource coordinator at a time occurring before the time of the meeting by a time period or amount to insure the presence or availability and operability of the resources at the time of the meeting. In other words an individual in another building with a longer travel time to get to the meeting will be reminded earlier than an individual near the meeting location. The individual's location can be determined via GPS techniques or other location determining technologies or assumed from their usual location or assumed based on their schedules derived from their calendars. An individual scheduled for another meeting as a desirable participant may get reminded earlier and more often if they are also scheduled as an essential participant in an immediately subsequent meeting or earlier than a participant in the later meeting with no earlier commitments. The prompting by the resource or on behalf of the resource would take into consideration a location of the resource, relative to the location for a meeting that is to be facilitated by that resource, based, for example, on AP access point information as well as any expected tear down, transport, or set up times for a resource and may consider coordinator transit times to the resource when that information is available or may add a default time for such transit if nothing better is available. This sort of information would be preprogrammed into the processing function as a lookup table or perhaps available via lookup table from a central repository such as the server.

Figure 3:
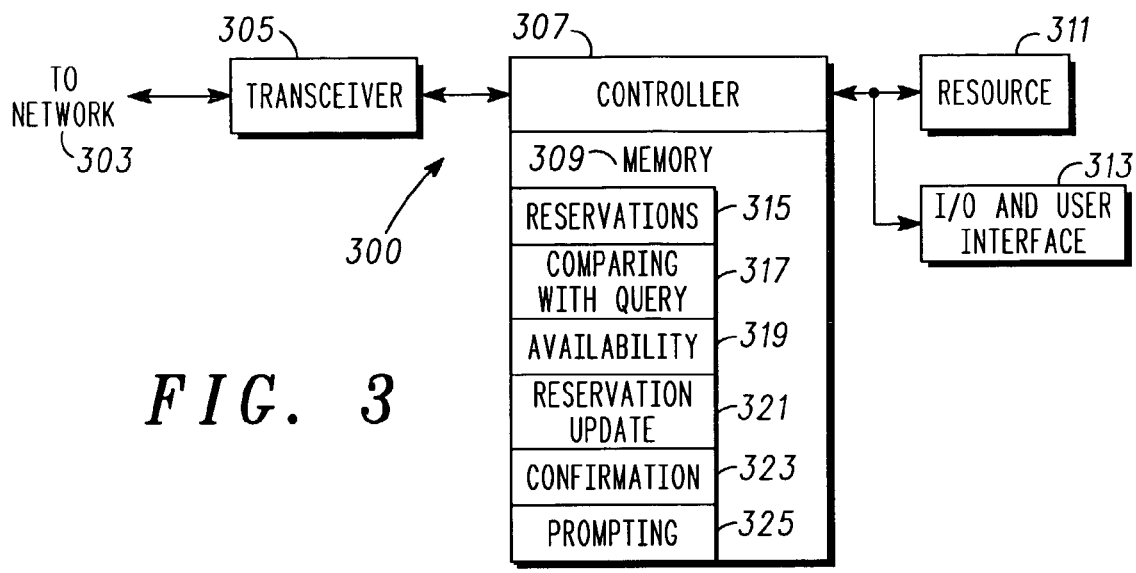
FIG. 3. depicts a block diagram of a preferred embodiment of a processing function, within a resource, that facilitates setting up a meeting.

Referring to FIG. 3, a block diagram of a preferred embodiment of a processing function, within or associated with a resource, will be discussed and described. The processing function 300 is arranged and operational for setting up and otherwise facilitating a meeting that will use the resource 311. It is expected that the processing function would be an intimate, embedded part of the resource although it could be remote and operate on behalf of the resource. The latter arrangement would, for example, increase the likelihood of a mismatch between the resource status, such as location and availability, versus the status that the processing function expects.

The processing function 300 includes inter coupled as depicted: a transceiver 305 arranged and constructed for coupling to a network 303, such as a wide area network (Internet), local area network (Intranet within a building, airport, etc.), wireless ad-hoc network (Bluetooth, IEEE 802.11, HyperLan, etc.); a controller 307 with associated memory 309; and an input/output or user interface 313. The processing function 300 may also include a GPS receiver or a port (not shown) for receiving GPS information for use in location determination for the resource. The transceiver is operable for receiving and sending or transmitting various access, query, response, confirmation, prompting, reminder, etc. messages, via a protocol corresponding to the particular network that is accessed, to other entities attached or coupled to the network or extended network. A different transceiver will be required when a wired network is accessed versus a wireless network with either known by those of ordinary skill.

These messages are passed to or originate with the controller for or as a result of processing performed by the controller, responsive to various software programs and instructions stored in the memory 309 or contents of messages, such as queries or access messages or inputs from the interface 313. The controller is a microprocessor based unit that may include one or more general purpose microprocessors or digital signal processors and the like as is known. The controller provides over all control and "intelligence", processing, communications, and database management activities for the processing function and operates to provide the interface between the network, associated resource 311, and user or other interface 313. The particular processing or operation of the controller is determined by the execution of software programs and instructions stored within the memory 309.

The memory is preferably resident with the controller or microprocessors thereof but may include certain memory elements at remote locations that would be accessed via the transceiver and network. The memory includes known memory devices such as one or more of RAM, ROM, EEPROM, and magnetic, or other media suitable for the task at hand. The instructions or routines stored therein will include a general operating system, communications routines, operating variables and constants, and a plethora of other routines none of which are depicted but that will be evident to one of ordinary skill given the principles and concepts discussed and described herein. Further included as depicted is a reservations area or database 315 for storing reservations indicating who, where, when, and so forth for various meetings the resource has been scheduled to facilitate; a comparing routine 317 for comparing current reservations with requested reservations or queries and scheduled times with present times and so forth; an availability routine 319 for determining when the resource is available given present reservations, current requests or queries and other incidental information or circumstances (such as out of service times for repair and maintenance and the like activities); reservation update routines 321 for modifying the database when a new reservation is accepted or when an existing reservation is changed; as well as confirmation and prompting routines 323, 325 for facilitating corresponding messages.

More particularly the transceiver 305 is for receiving a query regarding availability of the associated resource 311 for facilitating the meeting that is being scheduled or set up or arranged. This query will normally be from a meeting scheduling application responsive to a coordinator attempting to establish or schedule a meeting, however it may as well be from another processing function as a result of a priority induced conflict or other scheduling change or a similar query directed to the other resource. This query will include one or more of various attributes or specifics such as desired calendar, date, or timing or range of interest for each as well as likely time duration of that interest. For example 2 hours in the AM for any weekday within the next 4 days or within a date range may be included with the message.

This query will be passed to the controller, parsed and otherwise processed for comparing, using the comparing routine 317, the query or specifics of the query with reservations in the database 315 for the resource 311 that are stored in the memory 309 associated with the controller. Responsive to this query and comparison the controller will provide and cooperatively with the transceiver respond to the query with an availability response, using the availability routine 319 that includes either affirmative availability information or negative availability information each corresponding to the desired timing. For example if the desired timing was Monday through Wednesday, the "resource is available on Monday and Wednesday" is affirmative information while the "resource is reserved for Tuesday" is negative information or reservation information within the desired timing window. Availability information such as "resource is available on Monday and resource 2 is available on Tuesday and Wednesday" is also affirmative information that further demonstrates the result of a negotiation and communications among or between the two resources where the first resource has discovered information regarding the second resource as a result of the query without further intervention from the scheduling application or coordinator.

It is expected that in some instances, after the availability response has been forwarded, a reservation message will be received by the transceiver, forwarded to and processed by the controller and with the reservation update routine 321, a corresponding reservation will be stored in the memory by the controller. Then, using the confirmation routine 323 a confirmation message will be prepared and returned by the controller, cooperatively with the transceiver. As the date and time for a reservation approaches as determined by comparing reservation times with current times using the comparing routine 317 or as part of the prompting routine 325 the controller, cooperatively with the transceiver, will forward a prompting message to a meeting coordinator or a resource coordinator prior to the time for the meeting, where this time is sufficient to insure the resource is available and operational for the meeting. The time will be dependent on relative location of the resource and meeting as well as tear down, set up and so forth times. For example, if the resource is located within 50 meters from the meeting room, the controller may use a time of 10 minutes, whereas if it is more that a kilometer away, it may use 20 minutes. Similarly, the resource may also learn the location of the meeting coordinator and make the time depend on the relative location of the resource and the meeting coordinator. The prompt may also inform the meeting coordinator of the location of the resource.

Figure 4:
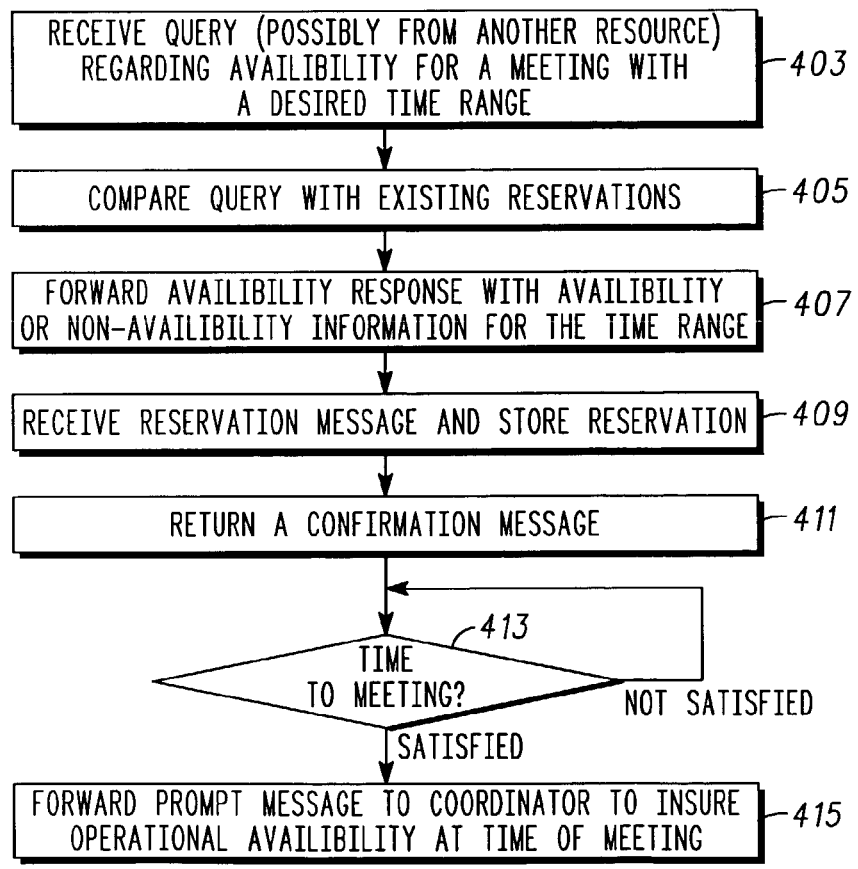
FIG. 4 illustrates a flow chart of a method embodiment suitable for execution by the processing function of FIG. 3.

Referring to FIG. 4 a flow chart of a method embodiment suitable for execution by the processing fimetion of FIG. 3 and similar to the methodologies discussed immediately above will be discussed and described. The method 400 is one of scheduling, establishing, or setting up and otherwise facilitating such activities for a meeting from the perspective of a resource or associated processing function. The method begins at 403 by receiving a query regarding availability of a resource for a meeting where the query includes meeting particulars such as desired date(s), times, duration, and so on and may originate with another resource. At 405 this query is compared in relevant part with reservations for the resource. An availability response including availability or non-availability information relative to the desired timing data is then forwarded 407. Receiving a reservation message and storing a. corresponding reservation is shown at 409 and returning a confirmation message is depicted at 411. The process at 413 repeatedly tests whether the time to a scheduled meeting is satisied and if so 415 shows forwarding a prompting or reminder message to the meeting coordinator or to a resource coordinator in time to insure that the resource is bath available and operational in order to support or facilitate the meeting. The testing at 413 will compare the time to meeting against a threshold determined based on circumstances of the resource such as distance from the meeting and relative complexity of tear down, transport, and set up procedures. This prompting or reminder message may as well go to a centralized meeting facilitation group or individual rather than the original coordinator.

The apparatus, processes, and systems described and discussed above and the inventive principles thereof are intended to and will alleviate problems caused by prior art meeting scheduling processes that ignored resource requirements. Using these principles of establishing meeting requisites and distributed processing for resources will facilitate meeting arrangement methodologies that are effective, efficient and friendly thus contributing to user satisfaction and lowering time wasted by large groups of people while proper resources for the meeting are obtained, etc. It is expected that one of ordinary skill given the above described principles, concepts and examples will be able to implement other alternative procedures that are situation dependent and that will also offer additional quick and efficient scheduling or coordination procedures for activities beyond meeting scheduling where individuals and resources must be coordinated. It is anticipated that the claims below cover such other examples.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of scheduling a meeting comprising:
   specifying a plurality of individuals to participate in the meeting and a list of desired resources for facilitating the meeting;
   communicating with a plurality of scheduling agents corresponding, respectively, with the plurality of individuals and with a processor function embedded with a resource corresponding to the list of desired resources;
   negotiating with the plurality of scheduling agents to determine availability of the plurality of individuals and with the processor function embedded with the resource to determine availability of the resource; and
   scheduling the meeting at a time when the resource and a sufficient number of the plurality of individuals are available.

2. The method of claim 1 wherein said specifying further includes specifying meeting characteristics.

3. The method of claim 2 wherein said specifying meeting characteristics further includes specifying one of a desired date, a desired time, an expected duration, essential individuals, and desirable individuals.

4. The method of claim 1 wherein
   said specifying a list of desired resources further includes specifying a plurality of desired resources;
   said communicating with a processor function further includes communicating with a plurality of processor functions for a plurality of resources corresponding to said plurality of desired resources;
   said negotiating includes negotiating with the plurality of processor functions to determine availability of said plurality of desired resources;
   said scheduling the meeting further includes scheduling the meeting at a time when a sufficient portion of the desired resources are available.

5. The method of claim 4, further including reserving the sufficient portion of the desired resources that are available for the time of the meeting.

6. The method of claim 5 further including a notifying and prompting the sufficient number of the plurality of individuals, said prompting occurring before the time of the meeting by a time period dependent on an individual's circumstances.

7. The method of claim 4 wherein said specifying a plurality of desired resources further includes specifying one of essential resources and desirable resources.

8. The method of claim 7 wherein said specifying one of essential resources and desirable resources further includes specifying one of; a plurality of meeting locations, audio video presentation resources for each of the meeting locations, audio visual links among the plurality of meeting locations, and network access capabilities.

9. The method of claim 4 wherein said negotiating further includes negotiating among the plurality of processor functions to identify said sufficient portion of the desired resources.

10. The method of claim 9 wherein said negotiating with and among the plurality of processor functions further includes negotiating with and among corresponding resources with an associated hierarchy and priority.

11. The method of claim 4 wherein said communicating and said negotiating with a plurality of processor functions further includes using a network and Universal Resource Identifiers for said communicating and said negotiating with said plurality of processor functions and said plurality of scheduling agents.

12. A method of setting up a meeting with a plurality of participants, the meeting to be facilitated by desired resources, the method comprising:
    specifying characteristics of the meeting and the desired resources for facilitating the meeting;
    communicating with a plurality of scheduling agents corresponding, respectively, with the plurality of participants and with a processor function for each of a plurality of resources corresponding to the desired resources, wherein the processor function for one of the plurality of resources is embedded with the one of the plurality of resources;
    negotiating, given the characteristics of the meeting, with the plurality of scheduling agents to determine availability of the plurality of participants and with the processor function for each of the plurality of resources to determine availability of the desired resources;
    scheduling the meeting when sufficient desired resources and a sufficient number of the plurality of participants are available; and
    reserving the desired resources that are available for the meeting.

13. The method of claim 12 wherein said specifying characteristics of the meeting further includes specifying one of a desired date, a desired time, an expected duration, essential participants, and desirable participants.

14. The method of claim 12 further including notifying and prompting the sufficient number of the plurality of participants, said prompting occurring before the time of the meeting by a time period dependent on one of a participant's circumstances and a resource's circumstances.

15. The method of claim 12 further including prompting one of a meeting coordinator and a resource coordinator before the time of the meeting by a time period that is sufficient to insure That said desired resources that are available are present and operational for the meeting.

16. The method of claim 12 wherein said specifying the desired resources further includes specifying one of; 1) essential resources defined as those resources required to conduct the meeting and 2) desirable resources defined as those resources that should be available to conduct the meeting.

17. The method of claim 16 wherein said specifying the desired resources further includes specifying one of; a plurality of meeting locations, audio video presentation resources for each of the plurality of meeting locations, audio visual links among the plurality of meeting locations, and network access capabilities.

18. The method of claim 12 wherein said negotiating further includes negotiating among a plurality of respective processor functions for the plurality of resources to identify said sufficient desired resources.

19. The method of claim 18 wherein said negotiating among the plurality of respective processor functions further includes negotiating with and among corresponding resources having an associated hierarchy and priority.

20. The method of claim 12 wherein said communicating and said negotiating with the processor function for each of the plurality of resources further includes using a network and Universal Resource Identifiers for said communicating and said negotiating with said processor function for each of the plurality of resources and said plurality of scheduling agents.

21. A processing apparatus for a resource that is arranged and operational for facilitating setting up a meeting, the processing apparatus comprising:
- a transceiver for receiving a query regarding availability of the resource for facilitating the meeting; and
- a controller embedded with the resource for comparing the query with reservations for the resource that are stored in a memory associated with the controller,
- where the controller, cooperatively with the transceiver, responds to the query with an availability response.

22. The processing apparatus of claim 21 wherein said query further includes attributes regarding desired timing for the meeting and said availability response further includes information corresponding to one of availability satisfying the desired timing and reservations within the desired timing.

23. The processing apparatus of claim 21 wherein, responsive to said availability response, a reservation message is received by the transceiver, a corresponding reservation is stored in the memory by the controller and a confirmation message is returned by the controller, cooperatively with the transceiver.

24. The processing apparatus of claim 21 wherein said controller, cooperatively with the transceiver, forwards a prompting message to one of a meeting coordinator and a resource coordinator prior to a time for the meeting, the time sufficient to insure the resource is available and operational for the meeting.

25. The processing apparatus of claim 21 wherein the transceiver receives the query from another processing apparatus corresponding to another resource.

26. The processing apparatus of claim 21 wherein the controller, cooperatively with the transceiver, sends a query to another processing apparatus corresponding to another resource.

27. The processing apparatus of claim 21 wherein the transceiver is coupled to a network that is one of a wide area network, local area network, and wireless ad-hoc network.

* * * * *